United States Patent
White

(10) Patent No.: US 8,323,387 B2
(45) Date of Patent: Dec. 4, 2012

(54) AIR FILTERING ASSEMBLY

(76) Inventor: Jody White, Columbia, MS (US)

(*) Notice: Subject to any disclaimer, the term of this patent is extended or adjusted under 35 U.S.C. 154(b) by 173 days.

(21) Appl. No.: 12/860,885

(22) Filed: Aug. 21, 2010

(65) Prior Publication Data

US 2012/0042782 A1   Feb. 23, 2012

(51) Int. Cl.
*F24F 3/16* (2006.01)
*B01D 53/02* (2006.01)

(52) U.S. Cl. .......... 96/134; 62/317; 62/78; 96/154; 55/490; 55/DIG. 6

(58) Field of Classification Search .......... 96/19, 108, 96/112; 95/8, 14; 62/78, 317
See application file for complete search history.

(56) References Cited

U.S. PATENT DOCUMENTS

| | | | |
|---|---|---|---|
| 2,197,120 A * | 4/1940 | Bergmann | 55/408 |
| 2,199,485 A * | 5/1940 | De Vout | 426/418 |
| 2,580,535 A * | 1/1952 | Feinberg | 62/285 |
| 2,811,840 A * | 11/1957 | Thompson | 62/302 |
| 3,912,473 A * | 10/1975 | Wilkins | 55/501 |
| 4,047,393 A * | 9/1977 | Hanson et al. | 62/428 |
| 4,470,834 A * | 9/1984 | Fasanaro et al. | 55/501 |
| 4,948,567 A * | 8/1990 | Atarashiya | 422/122 |
| 4,961,849 A * | 10/1990 | Hull et al. | 210/232 |
| 4,976,109 A * | 12/1990 | Garrett | 62/642 |
| 5,078,971 A * | 1/1992 | Matuda et al. | 422/121 |
| 5,136,853 A * | 8/1992 | Girardon et al. | 62/78 |
| 5,230,220 A * | 7/1993 | Kang et al. | 62/78 |
| 5,291,742 A * | 3/1994 | Kawatani et al. | 62/78 |
| 5,347,820 A * | 9/1994 | In Gweon | 62/78 |
| 5,438,841 A * | 8/1995 | Cahill-O'Brien et al. | 62/78 |
| 5,501,084 A * | 3/1996 | Chang et al. | 62/264 |
| 5,525,145 A * | 6/1996 | Hodge | 96/17 |
| 5,568,730 A * | 10/1996 | Kim et al. | 62/78 |
| 5,924,292 A * | 7/1999 | Markum | 62/78 |
| 6,126,708 A * | 10/2000 | Mack et al. | 55/502 |
| 6,221,120 B1 * | 4/2001 | Bennington et al. | 55/385.1 |
| 6,286,330 B1 * | 9/2001 | Kopf | 62/314 |
| 6,361,578 B1 * | 3/2002 | Rubinson | 55/487 |
| 6,454,841 B1 * | 9/2002 | Kaiser | 96/224 |
| 6,793,715 B1 * | 9/2004 | Sandberg | 95/273 |
| 6,918,259 B2 * | 7/2005 | Anderson et al. | 62/78 |
| 6,989,094 B2 * | 1/2006 | Knapp et al. | 210/167.19 |
| 7,499,275 B2 * | 3/2009 | Lai et al. | 361/695 |
| 8,065,885 B2 * | 11/2011 | Wang | 62/78 |
| 2003/0233818 A1 * | 12/2003 | Hensley | 55/490 |
| 2005/0089458 A1 * | 4/2005 | Oke | 422/207 |
| 2005/0183438 A1 * | 8/2005 | Sessa et al. | 62/317 |
| 2007/0245701 A1 * | 10/2007 | Su | 55/490 |

* cited by examiner

*Primary Examiner* — Duane Smith
*Assistant Examiner* — Christopher P Jones
(74) *Attorney, Agent, or Firm* — Jerry Haynes; Law Office of Jerry D. Haynes, P.A.

(57) ABSTRACT

An air filtering assembly capable of filtering the air having particle matter prior to entrance of the air into a compressor compartment of a refrigeration apparatus comprising: an air filtering device where it said air filtering device includes a frame and a filter member where the filter member includes a front surface and a rear surface; and a support device, where said support device is capable of attaching to an underneath portion of a door of the refrigeration apparatus. The filter member is made of a filtering material, where the filtering material is selected from at least one of a micro fiber material, a plastic material and a paper material. The frame of the air filtering device may be either a rectangular shape or a square shape.

7 Claims, 2 Drawing Sheets

AIR FILTERING ASSEMBLY

I. FIELD OF THE INVENTION

The present invention generally relates to air filtering assemblies, and, more particularly, to an air filtering assembly capable of preventing entry of particulate matter such as dust, mold, and the like, into a compressor compartment of a refrigeration apparatus.

II. MOTIVATION FOR THE INVENTION

Typically a refrigeration apparatus, such as a refrigerator, a freezer, and the like, includes a cabinet having a storage compartment and a door for accessing the storage compartment. The refrigeration apparatus is a free-standing structure and is usually placed on a flat surface such as a floor and the like. The cabinet of the refrigeration apparatus further includes a compressor compartment configured below the storage compartment for housing machine components such as a compressor unit, condenser coils, and the like. Further, the compressor compartment includes an air-vent portion capable of providing a passageway for hot air released by the machine components.

However, the air-vent portion of the compressor compartment may also provide an easy passageway for the entry of air with particulate matter such as dust, mold, bacteria, and the like. Further, the particulate matter become get accumulated on the machine components of the compressor compartment, and such an accumulation may impair the proper functioning of the machine components. Removal of the particulate matter from the machine components is a tedious job that involves cleaning of the refrigeration apparatus.

A conventional method of cleaning refrigeration apparatus for removing the particulate matter from the machine components involves use of cleaning tools such as a cleaning brush, a duster, and the like. Such cleaning tools may enable a user to remove the particulate matter in order to provide a clean environment in the compressor compartment for enhancing efficiency of the machine components. However, use of such conventional method for removing the particulate matter accumulated on the machine components is inconvenient and cumbersome, as the user needs to lie down on a surface supporting the refrigeration apparatus to reach the compressor compartment. Further, the cleaning tools are incapable of cleaning inaccessible areas in the compressor compartment for the removal of the particulate matter. Very often, the user may have to use his/her hand to reach the inaccessible areas in the compressor component to remove the particulate matter from the machine components. However, while cleaning, the hand of the user may get injured by metallic frames that may be located in the compressor compartment.

Further, during cold weather conditions, the particulate matter may accumulate to form a thick layer on the condenser coils present of the compressor compartment. Heat exchange by the condenser coils harden the thick layer of the particulate matter, which is difficult to remove from the condenser coils. Moreover, such condenser coils having the thick layer of particulate matter thereon may consume more power for exchanging heat; accordingly, use of the condenser coils with the thick layer of particulate matter thereon may prove cost-ineffective.

Furthermore, the compressor compartment may retain moisture therewithin from water that leaks from the storage compartment of the refrigeration apparatus, during improper working conditions of a cooling mechanism, and the like, of the refrigeration apparatus. Dampening of the compressor compartment from the leakage of the water from the storage compartment may impair the functioning of the machine components of the compressor compartment, which in turn reduces the lifespan of the refrigeration apparatus.

Attempts have been made to provide a protecting cover, such as a built-in window, for covering a compressor compartment of a refrigeration apparatus. Such built-in window is detachably attached to an air-vent portion of the compressor compartment of the refrigeration apparatus for providing a passageway for hot air released from the compressor compartment. However, the built-in window permits the flow of the hot air from the refrigeration apparatus, and as such is incapable of preventing entry of the particulate matter that may be present in the air into the compressor compartment.

Accordingly, there persists a need for precluding entrance of particulate matter present in the air into a compressor compartment of a refrigeration apparatus, in order to prevent accumulation of the particulate matter in the compressor compartment. Further, there exists a need for keeping a compressor compartment of a refrigeration apparatus free from moisture.

Therefore, it is an object of the present invention to obviate the above and other disadvantages from existing art and to provide an air filtering assembly that is capable of preventing particulate matter such as dust, mold and the like, from entering into a compressor compartment of a refrigeration apparatus.

It is further an object of the present invention to provide an air filtering assembly capable of keeping a compressor compartment of a refrigeration apparatus free from moisture.

It is still an object of the present invention to provide an air filtering device, which is, safe, user-friendly, and cost effective.

III. SUMMARY OF THE INVENTION

The present invention relates to an air filtering assembly capable of filtering the air having particle matter prior to entrance of the air into a compressor compartment of a refrigeration apparatus comprising: an air filtering device where it said air filtering device includes a frame and a filter member where the filter member includes a front surface and a rear surface; and a support device, where said support device is capable of attaching to an underneath portion of a door of the refrigeration apparatus. The filter member is made of a filtering material, where the filtering material is selected from at least one of a micro fiber material, a plastic material and a paper material. The frame of the air filtering device may be either a rectangular shape or a square shape.

IV. DESCRIPTION OF THE DRAWINGS

The advantages and features of the present invention will become better understood with reference to the detailed description taken in conjunction with the accompanying drawings, wherein like elements are identified with like symbols, and in which.

Like reference numerals refer to like parts throughout the description of several views of the drawings.

V. DESCRIPTION OF THE INVENTION

The best mode for carrying out the present invention is presented in terms of its preferred embodiment, herein depicted in FIGS. 1A, 1B, 1C, and 2. The preferred embodiments described herein detail for illustrative purposes are subject to many variations. It is understood that various omissions and substitutions of equivalents are contemplated as circumstances may suggest or render expedient, but are intended to cover the application or implementation without departing from the spirit or scope of the present invention.

The terms "first," "second," and the like, as used herein do not denote any order, quantity, or importance, but rather are used to distinguish one element from another, and the terms "a" and "an" as used herein do not denote a limitation of quantity, but rather denote the presence of at least one of the referenced item.

The present invention provides an air filtering assembly capable of filtering the air having particulate matter prior to entrance of the air into a compressor compartment of a refrigeration apparatus. More specifically, the air filtering assembly precludes the entry of the particulate matter into the compressor compartment of the refrigeration apparatus. The particulate matter may include dust, mold, bacteria, and the like. The present invention is also capable of keeping the compressor compartment of the refrigeration apparatus free from moisture. The present invention finds its utility with all types of refrigeration apparatuses in homes, and at commercial establishments such as hotels, restaurants, offices, and the like. For the purpose of explaining the present invention, a refrigerator may be taken as an example of the refrigeration apparatus. The refrigeration apparatus includes a cabinet with a storage compartment and a door for accessing the storage compartment. The refrigeration apparatus is a free-standing structure and capable of being placed on a flat surface such as a floor, and the like. The cabinet of the refrigeration apparatus further includes a compressor compartment configured below the storage compartment for housing machine components such as a compressor unit, condenser coils, and the like. Further, the compressor compartment includes an air-vent portion capable of providing a passageway for hot air released by the machine components. It will be evident to a person skilled in the art that the components of the refrigeration apparatus have been mentioned for the purpose of illustration only and the present invention is capable of being employed in all types of refrigeration apparatuses known in the art.

Figure 1A:
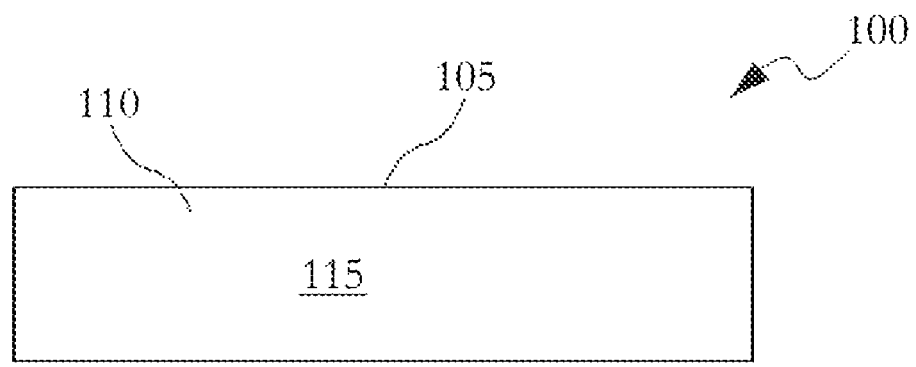
FIG. 1A illustrates a front view of an air filtering device of an air filtering assembly, in accordance with an embodiment of the present invention.
Figure 1B:
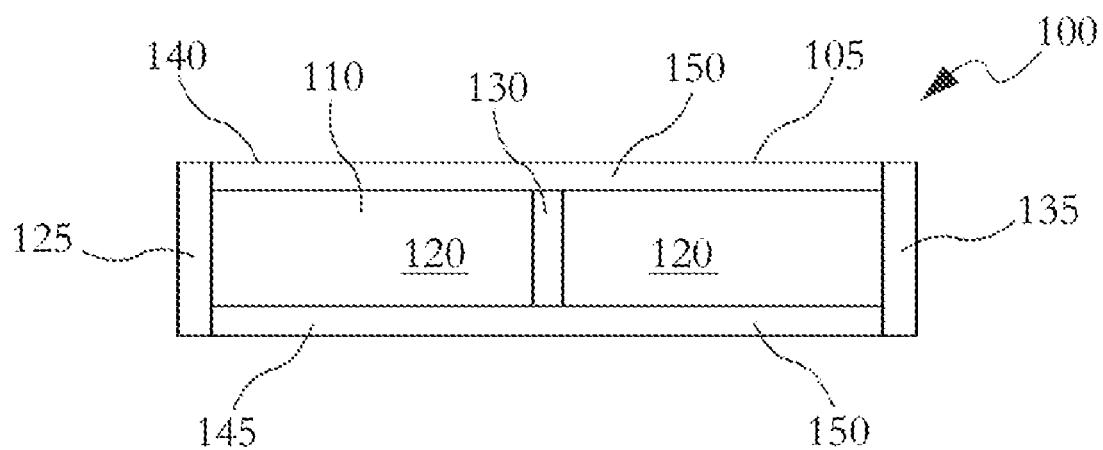
FIG. 1B illustrates a rear view of the air filtering device of FIG. 1A, in accordance with an embodiment of the present invention.

The air filtering assembly of the present invention includes an air filtering device and a support device. FIG. 1A illustrates a front view of the air filtering device, such as an air filtering device 100, in accordance with an embodiment of the present invention. FIG. 1B illustrates a rear view of the air filtering device 100. The air filtering assembly is capable of being removably attached to a refrigeration apparatus (not shown). More specifically, the air filtering device 100 is capable of being configured on a bottom portion (not shown) of the refrigeration apparatus and the support device is capable of being attached underneath portion of a door (not shown) of the refrigeration apparatus.

As shown in FIGS. 1A & 1B, the air filtering device 100 includes a frame 105. The air filtering device 100 further includes a filter member 110 having a front surface 115 (as shown in FIG. 1A) and a rear surface 120 (as shown in FIG. 1B). The filter member 110 is made of a filtering material such as microfiber material, plastic material, paper material, and the like. However, it will be evident to a person skilled in the art that the above mentioned materials may not be construed as limiting the scope of the present invention, and accordingly any other suitable material known in the art may be utilized. The frame 105 of the air filtering device 100 may be either rectangular in shape or square in shape. However, it will be evident that the frame 105 may have any other shape known in the art that may suitably be configured on the bottom portion of a refrigeration apparatus.

Further, the frame 105 includes a plurality of slots such as a first slot 125, a second slot 130, and a third slot 135. Each of the plurality of slots is configured with a metal attracting material, such as a magnetic strip (not shown), which enables the air filtering device 100 to be easily affixed to the bottom portion of the refrigeration apparatus. It will be apparent to those skilled in the art that placement of the plurality of slots is set forth herein for purposes of illustration, and that the present invention is not limited to the placement of the plurality of slots on the frame 105 of the air filtering device 100. Further, the frame 105 is configured with additional slots such as a fourth slot 140 and a fifth slot 145 for receiving a sealing member such as a sealing member 150, therein.

Figure 1C:
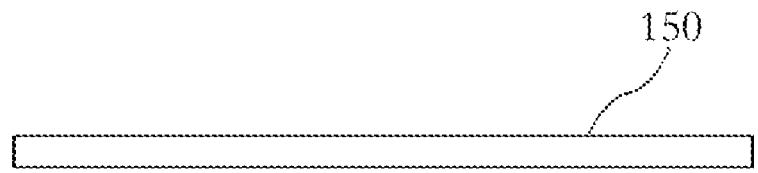
FIG. 1C illustrates a sealing member to be configured on the air filtering device of FIGS. 1A & 1B, in accordance with an embodiment of the present invention.

FIG. 1C illustrates the sealing member 150 that may be fitted on the fourth slot 140 and/or the fifth slot 145 of the frame 105. The sealing member 150 provides an airtight sealing of the air filtering device 100 over a surface of the bottom portion of the refrigeration apparatus. In an embodiment of the present invention, the sealing member 150 is made of a rubber material.

Figure 2:
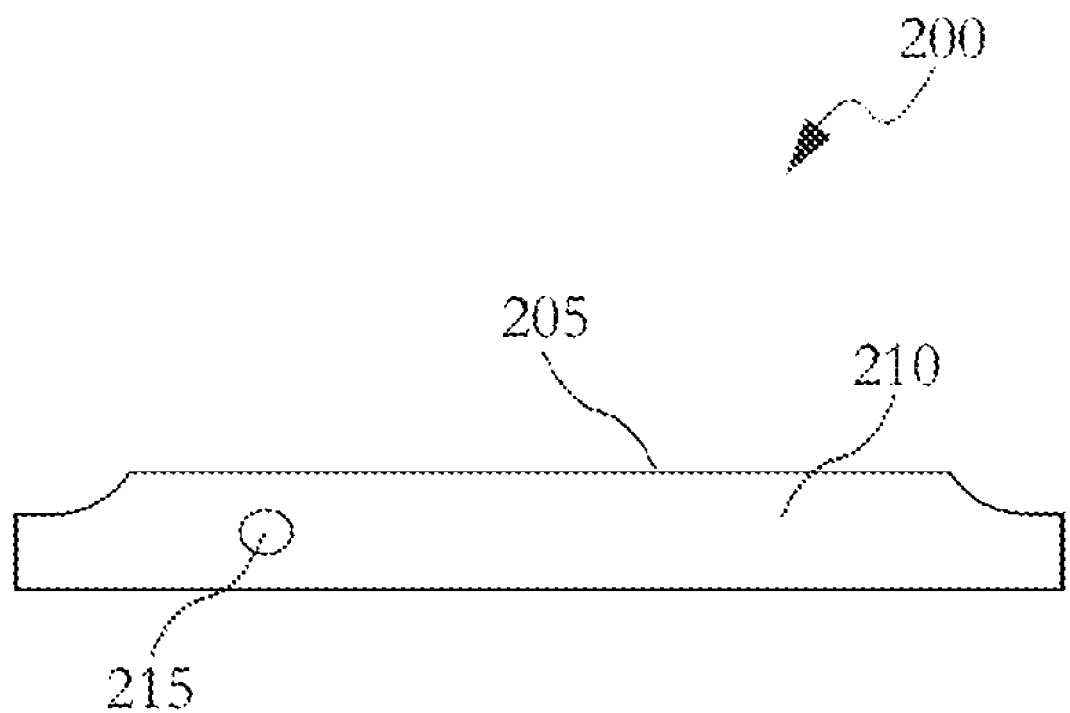
FIG. 2 illustrates a top view of a support device of the air filtering assembly, in accordance with an embodiment of the present invention.

FIG. 2 illustrates a support device 200 of the air filtering assembly, in accordance with an embodiment of the present invention. The support device 200 is capable of attaching to an underneath portion of a door of the refrigeration apparatus. The support device 200 includes a frame member 205 and a body portion 210. Further, the body portion 210 is configured with an opening 215 thereon. A punch-out structure (not shown) may act as a self-cover for covering the opening 215. The body portion 210 may be made of a water absorbing material such as a fiber material, and the like, which is capable of absorbing and retaining water that may leak from a storage compartment of the refrigeration apparatus. Accordingly, the body portion 210 prevents entry of the water from the storage compartment to the compressor compartment in order to provide the compressor compartment. In an embodiment of the present invention, the frame member 205 of the support device 200 may be configured with a rubber foam (not shown). The rubber foam provides an airtight attachment of the support device 200 with the underneath portion of the door of the refrigeration apparatus.

The air filtering device 100 disclosed herein may be configured in different sizes, and shapes, depending on the size of the bottom portion of the refrigeration apparatus. In an embodiment of the present invention, the air filtering device 100 may be about 35 inches in length, about 10 inches in height, and about 0.375 inches in width. The support device 200 may be about 35 inches in length, about 5 inches in height, and about 0.5 inches in width.

In use, the air filtering device 100 is configured on a bottom portion of a refrigeration apparatus. The air filtering device 100 includes the frame 105 having the plurality of slots thereon for receiving magnetic strips. The metal attracting property of the magnetic strips enables the air filtering device 100 to be firmly affixed to the bottom portion of the refrigeration apparatus. It will be evident to a person skilled in the art that the bottom portion of the refrigeration apparatus is made of a metallic material capable of being attracted to the magnetic strips of the plurality of slots. Further, the filter member 110 of the air filtering device 100 has the ability to filter the air passing into the compressor compartment in order to prevent entry of particulate matter present in the air Specifically, the particulate matter from the air is collected on the front surface 115 of the filter member 110. Accordingly, the particulate matter may be prevented from accumulating on the machine components of the compressor compartment, and as such, the air filtering device 100 provides a clean environment within the compressor compartment.

Further, the support device 200 configured on an underneath portion of a door of the refrigeration apparatus is capable of absorbing and retaining water that may leak from a storage compartment of the refrigeration apparatus. Accordingly, the support device 200 prevents entry of the water leaking from the storage compartment into the compressor compartment.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiments were chosen and described in order to best explain the principles of the present invention and its practical application, to thereby enable people skilled in the art to best utilize the present invention and various embodiments with various modifications as are suited to the particular use contemplated.

What is claimed is:

1. An air filtering assembly capable of filtering the air having particle matter prior to entrance of the air into a compressor compartment of a refrigeration apparatus comprising:

a. an air filtering device where said air filtering device includes a frame and a filter member where the filter member includes a front surface and a rear surface; and
   b. a support device, where said support device is capable of attaching to an underneath portion of a door of the refrigeration apparatus and said support device includes a frame member and a body member wherein the body member is configured with an opening, wherein the body portion is made of a water-absorbing material, where said water-absorbing material is a fiber-type material capable of absorbing and retaining water that may leak from a storage compartment of the refrigeration apparatus.

2. The air filtering assembly according to claim 1, wherein the filter member is made of a filtering material, where said filtering material is selected from at least one of a micro fiber material, a plastic material and a paper material.

3. The air filtering assembly according to claim 1, where the frame of the air filtering device may be in at least one of a rectangular shape and a square shape.

4. The air filtering assembly according to claim 1, where the frame includes a plurality of slots.

5. The air filter device according to claim 4, where said plurality of slots include a first slot, a second slot and a third slot and said a plurality of slots include a metal attracting material, where said metal attracting material enables the air filtering device to be affixed to the bottom portion of the refrigeration apparatus.

6. The air filtering assembly according to claim 5, wherein the frame is configured with a fourth slot and a fifth slot for receiving a sealing member.

7. The air filtering assembly according to claim 6, wherein the sealing member provides an airtight sealing of the air filtering device and said sealing member is made of a rubber material.

* * * * *